United States Patent

Sawamura et al.

[11] Patent Number: 5,472,490
[45] Date of Patent: Dec. 5, 1995

[54] PIGMENT COMPOSITION, PRINTING INK AND COATING COMPOSITION

[75] Inventors: Katsuhiko Sawamura; Shigeki Kato; Hitoshi Maki; Mikio Hayashi, all of Tokyo, Japan

[73] Assignee: Toyo Ink Manufacturing Co., Ltd., Tokyo, Japan

[21] Appl. No.: 229,779

[22] Filed: Apr. 19, 1994

[30] Foreign Application Priority Data

Apr. 23, 1993 [JP] Japan .................................. 5-097952

[51] Int. Cl.$^6$ .................................................. C09B 67/50
[52] U.S. Cl. ........................ 106/413; 106/410; 106/411
[58] Field of Search .................................. 106/410, 411, 106/413

[56] References Cited

U.S. PATENT DOCUMENTS

| | | | |
|---|---|---|---|
| 2,816,045 | 12/1957 | Cooper et al. | 106/411 |
| 4,055,440 | 10/1977 | Wheeler et al. | 106/411 |
| 4,194,921 | 3/1980 | Wheeler et al. | 106/413 |
| 4,205,995 | 6/1980 | Wheeler et al. | 106/413 |
| 4,350,534 | 9/1982 | Fechner et al. | 106/411 |
| 5,194,088 | 3/1993 | Babler er al. | 106/413 |
| 5,296,023 | 3/1994 | Gergory et al. | 106/413 |

FOREIGN PATENT DOCUMENTS

| | | |
|---|---|---|
| 0043932 | 1/1982 | European Pat. Off. . |
| 0526068 | 2/1993 | European Pat. Off. . |
| 2076884 | 10/1971 | France . |
| 2307022 | 11/1976 | France . |
| 2640063 | 3/1977 | Germany . |
| 57-042770 | 3/1982 | Japan .................. 106/413 |
| 1263684 | 2/1972 | United Kingdom . |
| 1544839 | 4/1979 | United Kingdom . |
| 2009205 | 6/1979 | United Kingdom . |

OTHER PUBLICATIONS

Derwent abstract 31770 E/16 of JP 57–042770, Mar. 1982.
Toyo Ink Mfg. K.K., Database WPI Week 8209, Derwent Publications Ltd., London GB AN 82–26622e JP-A-5 712 067 Jan. 21, 1982.

*Primary Examiner*—Mark L. Bell
*Assistant Examiner*—Scott L. Hertzog
*Attorney, Agent, or Firm*—Wenderoth, Lind & Ponack

[57] ABSTRACT

A pigment composition which comprises a phthalocyanine pigment, a phthalocyanine derivative (A) of the formula (1), $$Pc\text{-}(SO_3^-\text{}^+NR_1R_2R_3R_4)_n \qquad (1)$$

and at least one compound (B) selected from the class consisting of a compound of the formula (2), $$(M_1)_j X \qquad (2)$$

an aliphatic compound containing carboxylic acid alkali metal salt and an aliphatic compound containing carboxylic acid ammonium salt, and which imparts a printing or a coating with excellent gloss and shows excellent fluidity and stability with time when dispersed in a vehicle for a printing ink or a coating composition.

4 Claims, No Drawings

PIGMENT COMPOSITION, PRINTING INK AND COATING COMPOSITION

FIELD OF THE INVENTION

The present invention relates to a pigment composition which shows excellent fluidity and stability with time when dispersed in a vehicle for a printing ink such as a gravure ink or an offset ink or in a vehicle for a coating composition and which imparts the printing ink or coating composition with excellent gloss; a printing ink comprising the pigment composition and a vehicle; and a coating composition comprising the pigment composition and a vehicle.

PRIOR ART OF THE INVENTION

A phthalocyanine pigment has clear color tone and high tinting strength. However, it is known that it is difficult to obtain a stable dispersion of a phthalocyanine pigment in a vehicle for an offset ink, a gravure ink or a coating composition and that a phthalocyanine pigment causes crucial problems on the value of a product quality.

Fox example, a dispersion of a pigment formed of fine particles is liable to show a high viscosity, and it is hence difficult to take a product (a printing ink or a coating composition) from a dispersing apparatus or transport the product. Further, the above dispersion sometimes undergoes gelation when stored, and such a gelled dispersion is no longer usable. In some cases, fine particles of the pigment are liable to form aggregates and the aggregates may precipitate in a vehicle. Moreover, a printing ink or a coating composition as a product may have or show defective states such as a decrease in the gloss or the tinting strength and a defective leveling.

Having nothing to do with the pigment dispersion, a phthalocyanine pigment shows a phenomenon involving a change in its crystal state. That is, in a non-aqueous vehicle for an offset ink, a gravure ink or a coating composition, particles of the pigment unstable with regard to energy morphologically change to bring themselves into a stable state. As a result, coarse particles occur in the vehicle, the hue of a printing or a coating greatly changes, or the tinting strength of the pigment decreases to impair the commercial value of a product.

For overcoming the above problems, several methods have been already proposed. For example, as a method effective to some extent, Japanese Patent Publications Nos. 39-28884 and 40-4143, JP-A-52-33922, JP-A-57-12067 and JP-A-3-33166 disclose methods in which a phthalocyanine pigment is mixed with an organic amine salt of phthalocyanine sulfonic acid. In these methods, the size and form of crystal particles do not change much, while the printing or coating sometimes has insufficient gloss, and in many cases, the pigment composition according to these methods is considerably defective in the fluidity and the stability with time.

SUMMARY OF THE INVENTION

It is an object of the present invention to provide a pigment composition which imparts a printing or a coating with excel lent gloss and shows excel lent fluidity and stability with time when dispersed in a vehicle for a printing ink such as a gravure ink or an offset ink or a coating composition.

It is another object of the present invention to provide a printing ink composition comprising the above pigment composition and a vehicle and a coating composition comprising the above pigment composition and a vehicle.

According to the present invention, there is provided a pigment composition comprising a phthalocyanine pigment, a phthalocyanine derivative (A) of the formula (1), $$Pc\text{-}(SO_3^-{}^+NR_1R_2R_3R_4)_n \qquad (1)$$

wherein Pc is a metal-free phthalocyanine or metalophthalocyanine residue or a metal-free phthalocyanine or metalophthalocyanine residue substituted with 1 to 15 chlorine or bromine atoms or with 1 to 15 chlorine and bromine atoms, each of $R_1$, $R_2$, $R_3$ and $R_4$ is independently a hydrogen atom, an alkyl group, a substituted alkyl group, an aryl group, a substituted aryl group or a polyoxyalkylene group, and n is an integer of 1 to 4, and at least one compound (B) selected from the class consisting of a compound of the formula (2), $$(M_1)_jX \qquad (2)$$

wherein $M_1$ is an alkali metal atom or $NH_4$, X is $CO_3$, $HCO_3$, $OH$, $SO_4$, $HSO_4$, $SO_3$, $HSO_3$, $PO_4$, $HPO_4$, $H_2PO_4$, $PHO_3$, $HPHO_3$, $H_2PO_2$, $NO_3$ or $NO_2$, and j is an integer of 1 to 3, an aliphatic compound containing carboxylic acid alkali metal salt and an aliphatic compound containing carboxylic acid ammonium salt.

Further, according to the present invention, there is provided a printing ink comprising the above pigment composition and a vehicle.

Furthermore, according to the present invention, there is provided a coating composition comprising the above pigment composition and a vehicle.

DETAILED DESCRIPTION OF THE INVENTION

The first aspect of the present invention is directed to a pigment composition comprising a phthalocyanine pigment, the phthalocyanine derivative (A) of the above formula (1) and at least one compound (B) selected from the class consisting of the compound of the formula (2), an aliphatic compound containing carboxylic acid alkali metal salt and an aliphatic compound containing carboxylic acid ammonium salt.

The phthalocyanine pigment used in the present invention includes a metal-free phthalocyanine and a metalophthalocyanine containing a metal such as copper, zinc, iron, nickel, cobalt, tin, titanium, silicon, vanadium, manganese or aluminum. The above metal-free phthalocyanine and metalophthalocyanine may be substituted with 1 to 16 chlorine atoms or bromine atoms or with 1 to 16 chlorine and bromine atoms.

The phthalocyanine derivative (A) of the formula (1) includes a metal-free phthalocyanine derivative and a metalophthalocyanine containing a metal such as copper, zinc, iron, nickel, cobalt, tin, titanium, silicon, vanadium, manganese or aluminum.

The phthalocyanine derivative (A) of the formula (1) can be formed by reacting phthalocyaninesulfonic acid with an amine component. The amine component is not specially limited, and it includes primary, secondary, tertiary and quaternary amines. The amine component can be selected, for example, from amines described in Japanese Patent Publications Nos. 39-28884 and 40-4143, JP-A-52- 33922, JP-A-57-12067 and JP-A-3-33166. Specific examples of the primary amine as the amine component include amines such as hexylamine, heptylamine, octylamine, nonylamine, decylamine, undecylamine, dodecylamine, tridecylamine, tetradecylamine, pentadecylamine, hexadecylamine, heptadecylamine, octadecylamine, nonadecylamine and eicosylamine, which may have a branch, and unsaturated amines corresponding to the numbers of carbon atoms of these amines. Specific examples of the secondary, tertiary and quaternary amines include those amines constituted of combinations of alkyl or aryl constituting the above primary amines and methyl, ethyl, propyl, butyl and/or propyl. Examples of the secondary and tertiary amines and the quaternary ammonium salt include dioleylamine, distearylamine, dimethyloctylamine, dimethyldecylamine, dimethyllaurylamine, dimethylstearylamine, dilaurylmonomethylamine, trioctylamine, dimethyldidodecylammonium chloride, dimetyldioleylammonium chloride, dimethyldidecylammonium chloride, dimethyldioctylammonium chloride, trimethylstearylammonium chloride, dimethyldistearylammonium chloride, trimethyldodecylammonium chloride, trimethylhexadecylammonium chloride, trimethyloctadecylammonium chloride, dimethyldodecyl tetradecylammonium chloride and dimethylhexadecyloctadecylammonium chloride.

When one or some of $R_1$, $R_2$, $R_3$ and $R_4$ in the formula (1) are an alkyl group, a substituted alkyl group, an aryl group or a substituted aryl group, the substituent on the amine component (which can be reacted with phthalocyaninesulfonic acid for forming the compound of the formula (1) includes primary amino group, a secondary amino group, a tertiary amino group, a halogen, a hydroxyl group, a carbonyl group, a carboxyl group, an ether group, an ester group and an acyl group. When the amine component has an amino group as a substituent in particular, the amine component can be a polyamine such as diamine, triamine, tetramine, pentamine or hexamine.

When one or some of $R_1$, $R_2$, $R_3$ and $R_4$ in the formula (1) are polyoxy alkylene groups, the polyoxyalkylene group includes a polyoxyethylene group and a polyoxypropylene group.

The method for the production of the phthalocyanine derivative of the formula (1) used in the present invention is not specially limited. It is generally produced by a method in which a phthalocyanine pigment is sulfonated according to a conventional method and the sulfonated phthalocyanine pigment is allowed to react with the amine component in the presence of, or in the absence of, a solvent such as water or an organic solvent.

Examples of the compound of the formula (2) used in the present invention include lithium hydroxide, sodium hydroxide, potassium hydroxide, lithium carbonate, sodium carbonate, potassium carbonate, ammonium carbonate, sodium hydrogencarbonate, potassium hydrogencarbonate, ammonium hydrogencarbonate, lithium sulfate, sodium sulfate, ammonium sulfate, lithium sulfite, sodium sulfite, potassium sulfite, ammonium sulfite, lithium phosphate, potassium phosphate, ammonium phosphate, lithium nitrate, sodium nitrate, potassium nitrate, ammonium nitrate, lithium nitrite, sodium nitrie, potassium nitrite and ammonium nitrie. In particular, the use of any one of the above carbonates gives an excellent result.

The aliphatic compound containing carboxylic acid alkali metal salt, or the aliphatic compound containing carboxylic acid ammonium salt, used in the present invention has a small hydrophobic portion in the molecule, and does not have the function of so-called surface activity. The above aliphatic compound has the following formula (3), (4) or (5).

Formula (3) $R_5\text{-(COOM}_2)_m$

Formula (4) $COOM_2\text{-}COOM_2$

Formula (5) $HCOOM_2$ wherein $R_5$ is a saturated bond, a saturated or unsaturated aliphatic residue having 1 to 5 carbon atoms or a saturated or unsaturated aliphatic residue having 1 to 5 carbon atoms and having a substituent selected from a hydroxyl group, a halogen, a carbonyl group, an ether group, an acyl group, an amino group and a nitro group, m is a number of from 1 to 5, and $M_2$ or each $M_2$'s is an alkali metal atom, $NH_4$ or a hydrogen atom, provided that all the $M_2$'s in the formulae (3) and (4) cannot be hydrogen atoms.

Examples the compounds of the above formulae (3) to (5) include lithium salts, sodium salts, potassium salts and ammonium salts of formic acid, acetic acid, propionic acid, butyric acid, valeric acid, caproic acid, oxalic acid, malonic acid, succinic acid, glutaric acid, adipic acid, pimelic acid, citric acid, lactic acid, maleic acid and malic acid. In particular, the use of salt of acetic acid gives an excellent result.

The second aspect of the present invention is directed to a printing ink (gravure ink or offset ink) comprising the above pigment composition and a vehicle and a coating composition comprising the above pigment composition and a vehicle. The vehicle used in the printing ink and the vehicle used in the coating composition are not specially limited, and each vehicle may contain an auxiliary and an extender pigment.

The vehicle for the coating composition mainly comprises a resin and a solvent. Examples of the resin include an acrylic resin, an alkyd resin, an epoxy resin, a chlorinated rubber, vinyl chloride, a synthetic resin emulsion, a silicone resin, a polyurethane resin, a polyester resin, a melamine resin, a urea resin, a mixture of at least two of these, a water-soluble resin obtained by water-solubilizing any one of the above resins, and aqueous emulsion of the above resins. Examples of the solvent include a hydrocarbon, an alcohol, a ketone, an ether alcohol, an ether, an ester and water.

The vehicle for a gravure ink mainly comprises a resin and a solvent. Examples of the resin include gum rosin, wood rosin, tall oil rosin, lime rosin, a rosin ester, a maleic acid resin, a polyamide resin, a vinyl resin, nitrocellulose, cellulose acetate, ethylcellulose, a chlorinated rubber, a cyclized rubber, an ethylene-vinyl acetate copolymer resin, a urethane resin, a polyester resin, an alkyd resin, a gilsonite, dammar, shellac, a mixture of at least two of these, a water-soluble resin obtained by water-solubilizing any one of the above resins, and an aqueous emulsion of any one of the above resins. Examples of the solvent include a hydrocarbon, an alcohol, a ketone, an ether alcohol, an ether, an ester and water.

The vehicle for an offset ink mainly comprises a resin and a solvent. Examples of the resin include a rosin-modified phenolic resin, a petroleum resin, an alkyd resin and a dry oil-modified resin of any one of these. Examples of the solvent include plant oils such as linseed oil, tung oil and soybean oil, n-paraffin, isoparaffin, aromatic, naphthene, α-olefin and water.

The amount of the phthalocyanine derivative (A) of the formula (1) [to be sometimes referred to as "component (A)" hereinafter] is not specially limited, and the amount of the compound (B) [to be sometimes referred to as "component (B)" hereinafter, which is at least one member selected from the compounds of the formulae (2) to (5)] is not specially limited, either. However, per 100 parts by weight of the phthalocyanine pigment, preferably, the amount of the phthalocyanine derivative (A) is 0.1 to 30 parts by weight, and the amount of the compound (B) is 0.1 to 10 parts by weight, more preferably, the amount of the phthalocyanine derivative (A) is 3 to 20 parts by weight, and the amount of the compound (B) is 0.3 to 5 parts by weight.

Further, in the present invention, the methods for mixing the above components (A) and (B) with the phthalocyanine pigment are not specially limited.

The phthalocyanine pigment and the component (A) can be mixed, for example, by any one of the following methods.

1) A powder of the phthalocyanine pigment and a powder of the component (A) are simply mixed.

2) A slurry of the phthalocyanine pigment in water or an organic solvent and a slurry of the component (A) in water or an organic solvent are mixed to precipitate the component (A) on the pigment surface.

3) Pc-$(SO_3H)_n$ (n and Pc are as defined in the formula (1)) and an amine are added to a slurry of the phthalocyanine pigment in water or an organic solvent, and the component (A) is formed in the presence of the pigment.

4) The phthalocyanine pigment and the component (A) are co-dissolved in a solvent having high dissolving power such as sulfuric acid, and the pigment and the component (A) are co-precipitated in the presence of a poor solvent such as water.

5) The phthalocyanine pigment and the component (A) are dry-mixed, or wet-mixed in a state where an organic solvent, or the like is contained, with a dispersing or milling apparatus such as a kneader, a roll, an attriter or a super mill. Or, the above components are dry-mixed in the presence or absence of a milling aid such as sodium chloride, or wet-mixed in the presence of a milling aid such as sodium chloride and an organic solvent such as an alcohol or a polyol.

The phthalocyanine pigment and the component (B) [any one of the compounds of the formulae (2) to (5)] can be also mixed by the same method as that used for mixing the phthalocyanine pigment with the component (A). The component (B) having high solubility in water is eluted into a filtrate or wash liquid or removed when a slurry of a mixture of the phthalocyanine pigment with the component (B) in water is filtered or washed with water. As a result, the content of the component (B) is much smaller than the content of the component (B) at the mixing time, or is completely lost, and no intended effects cannot be obtained. The phthalocyanine pigment, the component (A) and the component (B) may be mixed in any order, or may be mixed at the same time.

The printing ink of the present invention or the coating composition of the present invention can be produced by the following methods, although their production methods are not specially limited thereto.

1) A composition containing the phthalocyanine pigment, the component (A) and the component (B) is dispersed in a vehicle.

2) The phthalocyanine pigment, the component (A) and the component (B) are separately dispersed in vehicles, and the so-prepared dispersions are mixed.

3) The phthalocyanine pigment is dispersed in a vehicle, and then the components (A) and (B) are mixed with, or dispersed in, the so-prepared dispersion.

4) The phthalocyanine pigment and the component (A) are simultaneously dispersed in a vehicle, or the phthalocyanine pigment containing the component (A) is dispersed in a vehicle, and then the component (B) is mixed with, or dispersed in, the so-prepared dispersion.

In the production of the printing ink of the present invention or the coating composition of the present invention, the phthalocyanine pigment, the component (A) and the component (B), or a mixture of these, can be excellently mixed with, or dispersed in, a vehicle with a dissolver, a high-speed mixer, a homomixer, a kneader, a flusher, a roll mill, a sand mill or an attriter.

When dispersed in a vehicle for a printing ink or a coating composition, the pigment composition of the present invention in a vehicle gives a dispersion excellent in fluidity and stability with time over a conventional printing ink or coating composition containing a phthalocyanine pigment alone or a mixture of a phthalocyanine pigment with a phthalocyaninesulfonic acid amine salt, and a printing and a coating obtained from a printing ink or a coating composition containing the pigment composition of the present invention is improved in gloss.

Further, when used for coloring plastics, the pigment composition according to the present invention exhibits an excellent dispersion effect and gives a coloring product having excellent tinting strength.

The present invention will be explained more in detail hereinafter with reference to Examples, in which "part" stands for "part by weight" and "%" stands for "% by weight".

Table 1 shows compounds [phthalocyanine derivatives (A)] which are included in the compound of the formula (1), and the compound numbers referred to in Examples correspond to the compound numbers shown in Table 1.

TABLE 1

| Compound No. | Structure |
| --- | --- |
| 1 | CuPc—[$SO_3^-{}^+NH_3(C_8H_{17})$]$_4$ |
| 2 | $(Cl)_2$—CuPc—$SO_3^-{}^+NH_3(C_8H_{17})$ |
| 3 | CuPc—[$SO_3^-{}^+NH_3(C_{12}H_{25})$]$_3$ |
| 4 | $(Cl)_{12}$—CuPc—$SO_3^-{}^+NH_3(C_{12}H_{25})$ |
| 5 | $(Cl)_6(Br)_2$—CuPc—[$SO_3^-{}^+NH_3(C_{12}H_{25})$]$_3$ |
| 6 | CuPc—$SO_3^-{}^+NH_3(C_{18}H_{35})$ |
| 7 | CuPc—[$SO_3^-{}^+NH_2(C_{10}H_{21})_2$]$_2$ |
| 8 | FePc—$SO_3^-{}^+NH_2(C_{18}H_{35})_2$ |
| 9 | $(Cl)_5(Br)_5$—CuPc—$SO_3^-{}^+NH_2(C_{18}H_{35})_2$ |
| 10 | NiPc—$SO_3^-{}^+NH(CH_3)_2(C_{18}H_{37})$ |
| 11 | CuPc—[$SO_3^-{}^+N(CH_3)_3(C_{12}H_{25})$]$_2$ |
| 12 | CuPc—$SO_3^-{}^+N(CH_3)_2(C_{18}H_{37})_2$ |
| 13 | CuPc—$SO_3^-{}^+N(CH_3)(C_2H_5)_2[(CH_2CH(CH_3)O)_{25}H]$ |
| 14 | CuPc—$SO_3^-{}^+N(C_{18}H_{37})(CH_3)_2CH_2$ |

Notes;
CuPc = copper phthalocyanine,
FePc = iron phthalocyanine,
NiPc = nickel phthalocyanine

EXAMPLES 1–8 AND COMPARATIVE EXAMPLES 1–12

20 Parts of a pigment composition containing a phthalocyanine pigment, a phthalocyanine derivative (A) and a compound (B), all shown in Table 2, was mixed with 80 parts of a gravure ink vehicle shown below and 300 parts of steel balls, and the mixture was dispersed with a paint conditioner for 90 minutes to give a gravure ink. Then the gravure ink was measured for fluidity immediately after it was prepared, and it was also measured for a fluidity (stability with time) after it had been allowed to stand at 40° C. for 1 day with a BM viscometer. Further, this gravure ink (after standing as above) was spread on a film and measured for a gloss with a glossmeter.

| Vehicle for gravure ink | |
|---|---|
| Nitrocellulose (RS1/4) | 5.5 parts |
| Ethyl acetate | 4.0 parts |
| Isopropyl alcohol | 2.0 parts |
| Ethanol | 20.0 parts |
| Plasticizer | 1.0 part |

Further, a gravure ink was prepared from a phthalocyanine pigment alone or a mixture of a phthalocyanine pigment with a phthalocyaninesulfonic acid amine salt shown in Table 2 in the same manner as above. The so-obtained gravure ink was measured in the same manner as above.

Table 2 shows the results.

compound (B), all shown in Table 3, was mixed with the following varnishes, etc., of which the amounts are shown below and 300 parts of steel balls, and the mixture was dispersed with a paint conditioner for 60 minutes to give a coating composition. Then the coating composition was measured for fluidity immediately after it was prepared, and it was also measured for a fluidity (stability with time) after it had been allowed to stand at 40° C. for 1 day with a BM viscometer.

| | |
|---|---|
| Alkyd resin varnish (content of involatiles 60%) | 26.4 parts |
| Melamine resin varnish (content of involatiles 60%) | 13.6 parts |
| Swasol (trade name of Maruzen Sekiyukagaku Co.) | 20.0 parts |
| Mixed varnish added after dispersion (Alkyd/melamine = 7/3 (solid content) | 48.3 parts |

Further, a coating composition was prepared from a phthalocyanine pigment alone or a mixture of a phthalocyanine pigment with a phthalocyaninesulfonic acid amine salt

TABLE 2

PIGMENT COMPOSITION

| | | Phthalocyanine derivative (A) | | Compound (B) | | Fluididty (cps) | | |
|---|---|---|---|---|---|---|---|---|
| | | | | | | BM type viscometer Immediately after | 6 rpm values After standing | Gloss |
| | Pigment | No. | Amount | Compound | Amount | dispersion | at 40° C. for 1 day | (%) |
| CEx.1 | C.I. Pigment Blue 15:3 | — | — | — | — | 5,400 | 28,800 | 68 |
| CEx.2 | C.I. Pigment Blue 15:3 | 3 | 10% | — | — | 3,700 | 16,500 | 88 |
| Ex.1 | C.I. Pigment Blue 15:3 | 3 | 10% | sodium carbonate | 0.5% | 950 | 1,050 | 90 |
| CEx.3 | C.I. Pigment Blue 15:3 | 11 | 15% | — | — | 3,200 | 12,200 | 81 |
| Ex.2 | C.I. Pigment Blue 15:3 | 11 | 15% | potassium hydrogenoxalate | 1.0% | 1,200 | 2,000 | 84 |
| CEx.4 | C.I. Pigment Blue 15:1 | — | — | — | — | 7,700 | 30,100 | 65 |
| CEx.5 | C.I. Pigment Blue 15:1 | 1 | 5% | — | — | 4,500 | 12,300 | 80 |
| Ex.3 | C.I. Pigment Blue 15:1 | 1 | 5% | sodium hydroxide | 0.3% | 850 | 8,200 | 84 |
| CEx.6 | C.I. Pigment Blue 15:1 | 7 | 12% | — | — | 5,600 | 14,000 | 85 |
| Ex.4 | C.I. Pigment Blue 15:1 | 7 | 12% | disodium malonate | 2.0% | 2,200 | 2,600 | 88 |
| CEx.7 | C.I. Pigment Green 7 | — | — | — | — | 3,300 | 25,700 | 63 |
| CEx.8 | C.I. Pigment Green 7 | 2 | 7% | — | — | 2,700 | 18,500 | 77 |
| Ex.5 | C.I. Pigment Green 7 | 2 | 7% | sodium acetate | 1.5% | 2,100 | 3,060 | 82 |
| CEx.9 | C.I. Pigment Green 7 | 4 | 18% | — | — | 2,550 | 16,000 | 80 |
| Ex.6 | C.I. Pigment Green 7 | 4 | 18% | ammonium sulfate | 1.0% | 2,450 | 8,000 | 82 |
| CEx.10 | C.I. Pigment Green 36 | — | — | — | — | 6,200 | 30,030 | 66 |
| CEx.11 | C.I. Pigment Green 36 | 5 | 8% | — | — | 3,600 | 19,800 | 86 |
| Ex.7 | C.I. Pigment Green 36 | 5 | 8% | lithium formate | 4.0% | 1,050 | 1,300 | 88 |
| CEx.12 | C.I. Pigment Green 36 | 9 | 15% | — | — | 2,900 | 10,500 | 79 |
| Ex.8 | C.I. Pigment Green 36 | 9 | 15% | sodium lactate | 0.7% | 1,890 | 3,020 | 84 |

Ex. = Example, CEx. = Comparative Example

EXAMPLES 9–12 AND COMPARATIVE EXAMPLES 13–18

10 Parts of a pigment, composition containing a phthalocyanine pigment, a phthalocyanine derivative (A) and a compound (B), all shown in Table 3 in the same manner as above. The so-obtained coating composition was measured in the same manner as above.

Table 3 shows the results.

TABLE 3

PIGMENT COMPOSITION

| | | Phthalocyanine derivative (A) | | Compound (B) | | Fluididty (cps) | |
|---|---|---|---|---|---|---|---|
| | | | | | | BM type viscometer Immediately after | 6 rpm values After standing |
| | Pigment | No. | Amount | Compound | Amount | dispersion | at 40° C. for 1 day |
| CEx.13 | C.I. Pigment Blue 15:3 | — | — | — | — | 8,200 | 12,400 |
| CEx.14 | C.I. Pigment Blue 15:3 | 6 | 5% | — | — | 7,600 | 10,700 |
| Ex.9 | C.I. Pigment Blue 15:3 | 6 | 5% | potssium carbonate | 1.0% | 6,650 | 7,820 |
| CEx.15 | C.I. Pigment Blue 15:3 | 14 | 7% | — | — | 7,200 | 12,200 |
| Ex.10 | C.I. Pigment Blue 15:3 | 14 | 7% | ammonium acetate | 2.5% | 7,200 | 7,300 |
| CEx.16 | C.I. Pigment Green 36 | — | — | — | — | 6,800 | 11,000 |
| CEx.17 | C.I. Pigment Green 36 | 4 | 8% | — | — | 6,060 | 9,800 |
| Ex.11 | C.I. Pigment Green 36 | 4 | 8% | potassium hydroxide | 3.0% | 5,800 | 6,100 |
| CEx.18 | C.I. Pigment Green 36 | 9 | 10% | — | — | 5,660 | 9,430 |
| Ex.12 | C.I. Pigment Green 36 | 9 | 10% | disodium maleate | 3.5% | 5,120 | 6,990 |

Ex. = Example, CEx. = Comparative Example

The above results show that a printing ink or a coating composition containing the pigment composition according to the present invention exhibits excellent fluidity and excellent stability with time over a printing ink or a coating composition containing a phthalocyanine pigment alone or a mixture of a phthalocyanine pigment with a phthalocyaninesulfonic acid amine salt, and a printing obtained from the printing ink according to the present invention is also excellent over a printing ink containing a phthalocyanine pigment alone or a mixture of a phthalocyanine pigment with a phthalocyaninesulfonic acid amine salt.

What is claimed is:

1. A pigment composition comprising a phthalocyanine pigment, a phthalocyanine derivative (A) of the formula (1), $$Pc\text{-}(SO_3^-{}^+NR_1R_2R_3R_4)n \qquad (1)$$

wherein Pc is a metal-free phthalocyanine or metalophthalocyanine residue or a metal-free phthalocyanine or metalophthalocyanine residue substituted with 1 to 15 chlorine or bromine atoms or with 1 to 15 chlorine and bromine atoms, each of $R_1$, $R_2$, $R_3$ and $R_4$ is independently a hydrogen atom, an alkyl group, a substituted alkyl group, an aryl group, a substituted aryl group or a polyoxyalkylene group, and n is an integer of 1 to 4, and at least one compound (B) selected from the class consisting of a compound of the formula (2), $$(M_1)_jX \qquad (2)$$

wherein $M_1$ is an alkali metal atom or $NH_4$, X is $CO_3$, $HCO_3$, OH, $SO_4$, $HSO_4$, $SO_3$, $HSO_3$, $PO_4$, $HPO_4$, $H_2PO_4$, $PHO_3$, $HPHO_3$, $H_2PO_2$, $NO_3$ or $NO_2$, and j is an integer of 1 to 3.

2. A composition according to claim 1, wherein the metalophthalocyanine contains a metal selected from the group consisting of Cu, Zn, Fe, Ni, Co, Sn, Ti, Si, V, Mn and Al.

3. A printing ink comprising the pigment composition as recited in claim 1 and a vehicle for a printing ink.

4. A coating composition comprising the pigment composition as recited in claim 1 and a vehicle for a coating composition.

* * * * *